Feb. 4, 1964 W. H. EDMUNDS 3,120,628
SELECTIVE MOUNTING FOR CIRCUIT INTERRUPTERS
Filed Dec. 5, 1956 2 Sheets-Sheet 1

INVENTOR.
WILLIAM HAROLD EDMUNDS
BY Ostrolenk, Faber,
Gerb & Soffen
ATTORNEYS

Feb. 4, 1964 W. H. EDMUNDS 3,120,628
SELECTIVE MOUNTING FOR CIRCUIT INTERRUPTERS
Filed Dec. 5, 1956 2 Sheets-Sheet 2
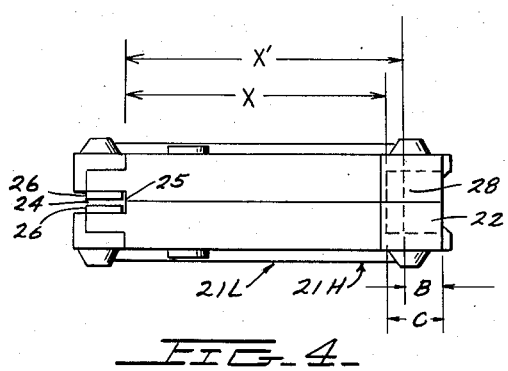
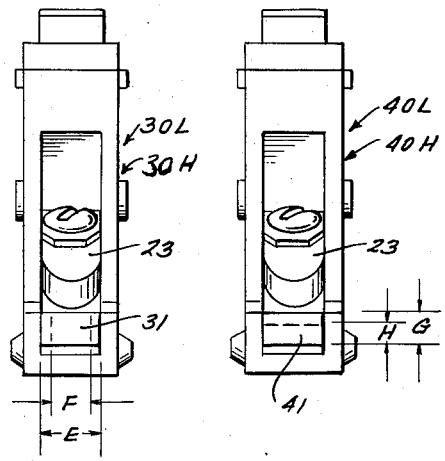
FIG. 4.   FIG. 6.   FIG. 5.
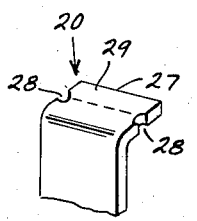 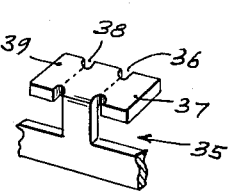 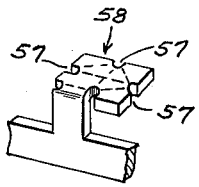 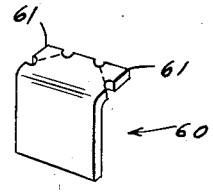
FIG. 3.   FIG. 7.   FIG. 8.   FIG. 8A.
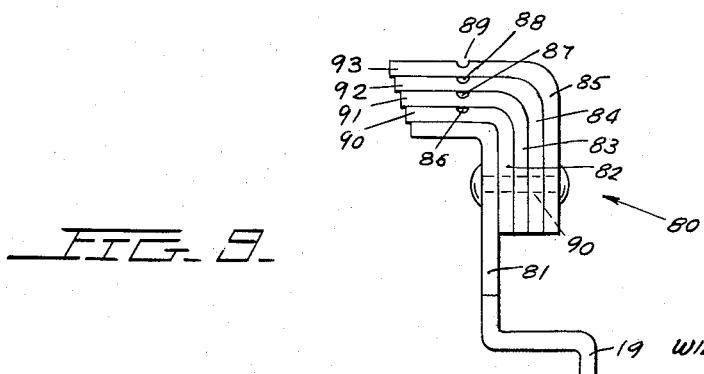
FIG. 9.
INVENTOR.
WILLIAM HAROLD EDMUNDS
BY
ATTORNEYS

United States Patent Office 3,120,628
Patented Feb. 4, 1964

3,120,628
SELECTIVE MOUNTING FOR CIRCUIT
INTERRUPTERS
William Harold Edmunds, Havertown, Pa., assignor to
I-T-E Circuit Breaker Company, Philadelphia, Pa., a
corporation of Pennsylvania
Filed Dec. 5, 1956, Ser. No. 626,442
5 Claims. (Cl. 317—119)

This invention relates to circuit interrupter mountings and more particularly to selective mountings that prevent the installation of a high rated circuit interrupter in place of a low rated circuit interrupter.

With present circuit breaker or other circuit interrupter mountings, it quite often happens that a high capacity circuit breaker is substituted for a low capacity circuit breaker either because the rating of the old breaker is not known or the rating of the replacement breaker is not known. This will eventually lead to overloading of the branch circuit wires and the possibility of fire.

It is desirable to provide a circuit breaker mounting that will prevent the substitution of a higher rating circuit breaker for a lower rating circuit breaker. This could be accomplished by constructing circuit breakers with housings having different size recesses that are used for mounting, with the higher rated breakers having the smaller sized recesses, and having different size mounting brackets to cooperate with the different sizes of recesses. Thus, it would not be possible to insert a higher rated breaker in place of a lower rated breaker since the recess for mounting the breaker would not be large enough for the bracket to be inserted therein.

One of the principal disadvantages of this type arrangement is that the panelboard builder would need to know exactly what the capacity of each circuit of the panelboard would be before he could ship the panelboard since it would be necessary to use different size brackets for the various circuit breaker ratings. This is not a practical arrangement. Therefore, some means should be devised whereby it is not necessary to use different brackets.

My invention provides a means whereby the panelboard maker manufactures a single size panelboard without the need to consider the requirements of the various branch circuits that will ultimately be fed through the panelboard. Once the panelboard is in the field, predetermined sections of the mounting bracket may be broken off as required to enable various rated circuit breakers to be positioned and secured to the panelboard. The different ratings of the circuit interrupter may be contained in same size housings with the housings having different sized mounting recesses for the different ratings.

My invention may be carried out by varying either the length, width, or thickness of the mounting bracket and mounting recess; by varying any combination of length, width, and thickness of the bracket and recess; or by altering the shape of the bracket and recess in any other convenient manner. It is possible to provide a different size mounting recess for each size circuit breaker and have the mounting bracket constructed to be broken off at a number of predetermined points. However, as a practical matter quite often a number of circuit breakers having different ratings are contained in identical sized housings having the same size mounting recess. For example, the circuit breakers illustrated in the preferred embodiments of my invention, to be hereinafter described, are of the EQP type described in I-T-E Circuit Breaker Company Cat. No. EQP 815. In this circuit breaker the 15 and 20 ampere rated breakers are housed in identical cases, while the breakers rated 30, 40 or 50 amperes are housed in identical cases but these cases differ from those housing the 15 and 20 ampere rated breakers.

Accordingly, a primary object of my invention is to provide a uniform panelboard that may be modified after installation to provide selective mountings for circuit interrupters to thereby prevent improper replacement of a higher rated circuit interrupter in place of a lower rated interrupter in spite of the fact that both interrupters are housed in the same size cases.

Another object is to provide a mounting bracket having a plurality of breakoff sections that may be broken off to modify the mounting bracket to predetermined dimensions and thereby provide a mounting bracket that may be modified to three or more sizes.

Another object of my invention is to provide circuit interrupters having different sized recesses for differently rated interrupters, with the higher rated interrupter having the smaller sized recess.

Still another object is to provide a different size circuit interrupter mounting bracket for differently rated circuit interrupters, with the smaller bracket being for the higher rating interrupter.

A still further object is to provide a circuit braker mounting bracket having a portion or portions that may be broken off so that the bracket may be accepted by the small recess of a higher rated circuit interrupting device that was too small to accept the mounting bracket before the breakoff sections were removed.

These and other objects of my invention will become apparent after reading the following description in connection with the drawings in which:

FIGURE 3 is a perspective view of a section of the load end retainer bracket showing a mounting bracket having a length adjustment.

FIGURE 4 is a bottom view of a circuit breaker.

FIGURE 5 is a view of the load side of the circuit breaker.

FIGURE 6 is a view as in FIGURE 3 showing another embodiment of my invention.

FIGURE 7 is similar to FIGURE 3 with the mounting bracket having a width adjustment.

FIGURE 8 is a similar to FIGURE 3 with the mounting bracket having both a length and a width adjustment.

FIGURE 8A is similar to FIGURE 3 with the mounting bracket having a shaping adjustment.

FIGURE 9 is similar to FIGURE 3 with the mounting bracket having a thickness adjustment in four steps.

Figure 1:
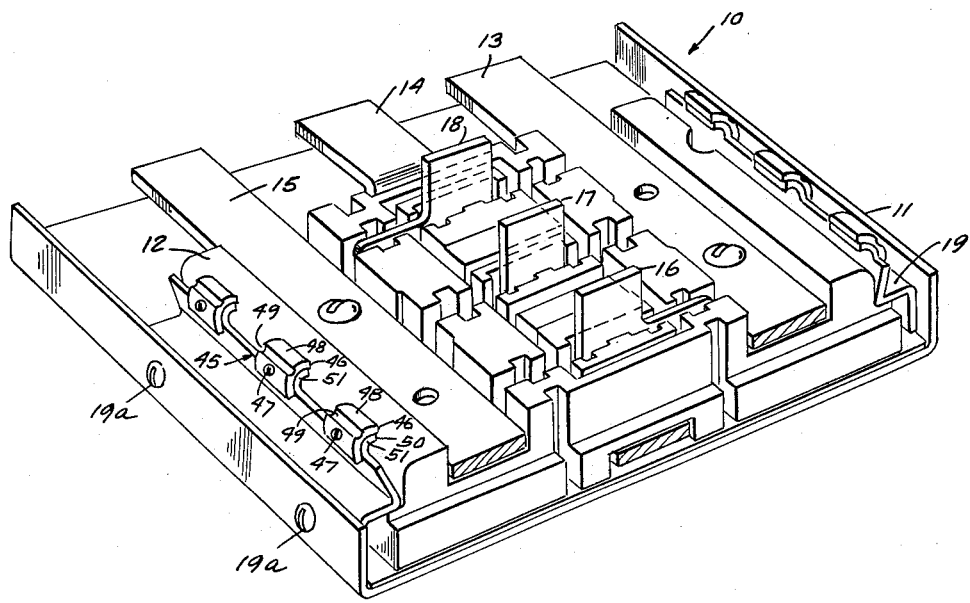
FIGURE 1 is a perspective view of a section of a panelboard having my selective mounting bracket with a height adjustment.

Referring to FIGURE 1. The panelboard 10 consists of a U-shaped frame 11, bus bars 13—15 having extensions 16—18, insulating block 12 mounted on the web of frame 11 to insulate and position the bus bars 13—15 and extensions 16—18, and retainer brackets 19 mounted on the arms of the frame 11 by means of screws 19a. Extending from the retaining brackets 19 are mounting brackets 45.

Referring to FIGURES 1 and 5, the high 40H and low 40L rating circuit breakers to be mounted to panelboard 10, having mounting brackets 45, are housed in the same size cases, with lower rated breakers having a recess 41 of height G and the higher rated breakers having a recess 41 of height H. To cooperate with recess 41 retainer brackets 19 are provided with mounting brackets 45 that consist of a main section 51 and auxiliary section 46 that is secured to main section 51 by screw 47 or any other suitable fastener. Notch 49, running the full width of the auxiliary section 46, defines the breakoff section 48. Break off of section 48 is quite convenient in that edge 50 of auxiliary member 46 slightly overlies the main section 51.

The lower rated breaker 40L with recess height G will accept the combined thickness of the main and auxiliary sections of mounting bracket 45 but the recess height H of the higher rated breakers 40H is too small to permit the higher rated breaker 40H to be mounted to the panelboard 10. In order to mount the higher rated breaker 40H it is necessary to break away section 48 thus reducing the thickness of the mounting bracket 45 so that it is less than height H of recess 41 of the higher rated circuit breaker 40H.

The circuit breakers 40H and 40L are mounted to the panelboard in the manner illustrated in FIGURE 2 and to be hereinafter more fully described.

Figure 2:
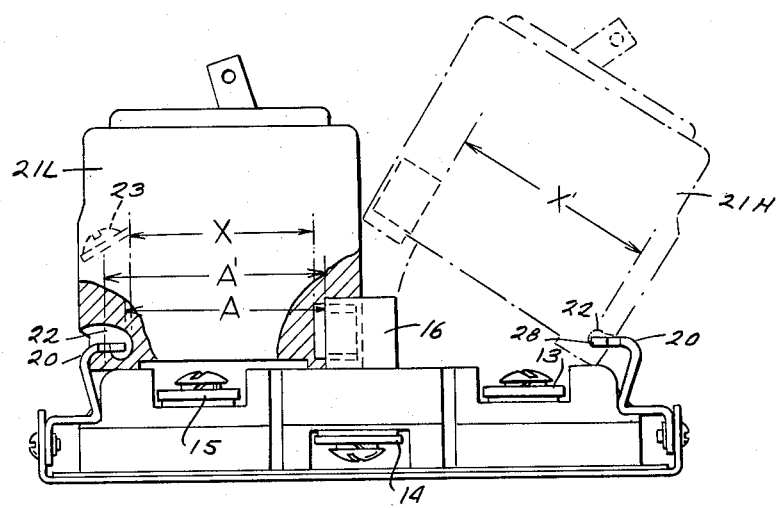
FIGURE 2 is an end view of a panelboard showing a low rated breaker mounted thereto and the inability of a high rated breaker from being mounted.

Referring to FIGURES 2, 3, and 4, a second embodiment of my invention is illustrated. Circuit breaker 21L is shown mounted to the panelboard 10 by means of mounting bracket 20, which mates with recess 22 located in the breaker 21L just below the load terminal 23, and the disconnect fingers 26 which are visible through opening 24 in the bottom of the breaker 21. Disconnect fingers 26 engage the bus bar extension 16 with a high pressure wiping action to form the line side electrical connection. Circuit breaker 21L is the breaker of the series having a low rating with a recess of depth C, while the high value breaker 21H has a recess 22 with a depth B which is less than depth C.

The depth C of recess 22 is such that the distance X is now less than the distance A which is the distance between the mounting bracket 20 and the bus bar extension 16. Should the operator attempt to install the higher rating circuit breaker 21H in place of the lower rating circuit breaker 21L, the end 27 of mounting bracket 21 would strike the bottom 28 of recess 22 and at this time the distance X' would be greater than the distance A. Therefore, the bottom of the higher rated breaker 21H would strike the bus bar extension 16 and prevent disconnect fingers 26 from engaging the extension 16. This would indicate that the rating of the breaker is too high for the branch circuit. In order to accommodate the higher rated breaker 21H it is necessary to break off a section 29 of the mounting plate 20 along a line passing through break off notches 28. By breaking off section 29 the length of bracket 20 is reduced, thus the distance A is increased to A' which is at least equal to the distance X' and the higher rated breaker 21H may now be mounted to the panelboard 10. Thus by reducing the length of mounting bracket 20 the panelboard 10 may now receive higher rated breakers.

A third embodiment of my invention is shown in FIGURES 6 and 7. In this embodiment the circuit breakers 30L and 30H each have a load side mounting recess 31 having a width E for the lower ratings, and a reduced width F for the higher ratings. The load end retainer brackets 19 are formed with mounting brackets 35. Notches 36 and 38 are cut from mounting bracket 35 to define the breakoff sections 37 and 39.

The mounting bracket 35 with the break off sections 37, 39 is not as wide as E but is wider than F. Thus only the recess 31 of lower rated breaker 30L is wide enough to accept the mounting bracket 35 before break off sections 37, 39 are removed. After the sections 37, 39 have been broken off the mounting bracket is now narrower than F and the narrow recess 31 of the higher rated breaker 30H can now be mounted on the panelboard 10.

A combination of length and width adjustment is shown in mounting bracket 55 of FIGURE 8 by breaking off portions defined by lines passing through notches 57. In FIGURE 8A the break off sections 61 of mounting bracket 60 are triangular in shape. Circuit breakers having appropriately shaped slots (not shown) must be provided to cooperate with mounting brackets 55 and 60.

FIGURE 9 illustrates an embodiment of my invention that is an amplification of the embodiment previously described in connection with FIGURES 1 and 5. Retainer bracket 19 is provided with a mounting bracket 80 that consists of a main section 81 and auxiliary sections 82—85 mounted thereon in successive layers and fastened to main section 81 by a rivet 94 or other suitable means. The auxiliary sections 82—85 have notches 86—89 cut therein to define lines for the break off sections 90—93.

With all the break off sections in place only the lowest rated breaker of the series may be mounted to the panelboard. After breaking off section 93 the size of the mounting bracket 80 is reduced a higher rated breaker to be mounted. For breakers of still higher ratings, sections 92, 91 and 90 may be broken off selectively in successive steps depending upon the rating of the breaker to be installed. With this arrangement, while all breaker ratings may be housed in the size case, the case will have a different height notch for each rating circuit breaker that is housed therein. With the arrangement illustrated in FIGURE 9, four adjustments and five sizes are achieved. This number may be increased by adding more auxiliary sections.

Just as the embodiment illustrated in FIGURES 1 and 5 was amplified to achieve the embodiment of FIGURE 9, so too may the other embodiments be amplified to achieve a plurality of adjustment to produce three or more predetermined sizes or shapes for the mounting bracket.

The break off sections as I have illustrated them are determined by lines passing through one notch or joining two notches. However, the lines may pass through a section of the mounting bracket that is weakened in any suitable manner, such as by a series of holes or perforations.

While I have described the circuit protective equipment of the various embodiments as being circuit breakers, any other suitable circuit interrupting device, such as a fuse, may be used. The differently rated circuit interrupters may all be housed in the same size cases.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In combination, an electrical panelboard and a plurality of electric circuit breakers mounted to said panelboard; said panelboard comprising a plurality of bus conductors, means defining a plurality of bus conductor terminal engaging points, a mounting means spaced from said points by a distance spanned by said circuit breakers, a plurality of panel registry means carried by said mounting means and each operatively positioned to align a circuit breaker with one of said points; each of said circuit breakers including a housing, a line terminal at one end of said housing in engagement with one of said bus conductors at one of said points, a load terminal at the other end of said housing, a recess in said housing at said other end thereof, said recess constituting a circuit breaker registry means and having one of said panel registry means disposed therein; each of said panel registry means having at least one removable portion to allow for mounting of others of said breakers of different operating characteristics and differently shaped registry means recesses at a given one of said panel registry means; each removable portion being operatively positioned so that upon removal of any portion the width of said panel registry means remains constant.

2. The combination of claim 1 in which said removable portions are defined by lines passing through weakened sections of said panel registry means to enable said portions to be broken as required.

3. The combination of claim 1 in which the panel registry means is reduced in length upon removal of any removable portion.

4. The combination of claim 1 in which the panel registry means is reduced in thickness upon removal of any removable portion.

5. The combination of claim 4 in which each of said panel registry means includes a plurality of layers at least some of which are provided with removable portions.

References Cited in the file of this patent

UNITED STATES PATENTS

| | | |
|---|---|---|
| 433,770 | Cunnington | Aug. 5, 1890 |
| 2,281,958 | Snavely | May 5, 1942 |
| 2,738,444 | Casey | Mar. 13, 1956 |
| 2,767,353 | Kingdon | Oct. 16, 1956 |
| 2,883,587 | Dorfman et al. | Apr. 21, 1959 |

FOREIGN PATENTS

| | | |
|---|---|---|
| 594,879 | France | Mar. 9, 1925 |

OTHER REFERENCES

Federal Noark Cat. 1000A, July 1953, pages 1, 2 and 3.